Aug. 22, 1933.  G. MANIERRE  1,923,836
LOADING MACHINE
Filed Feb. 27, 1932     10 Sheets-Sheet 2
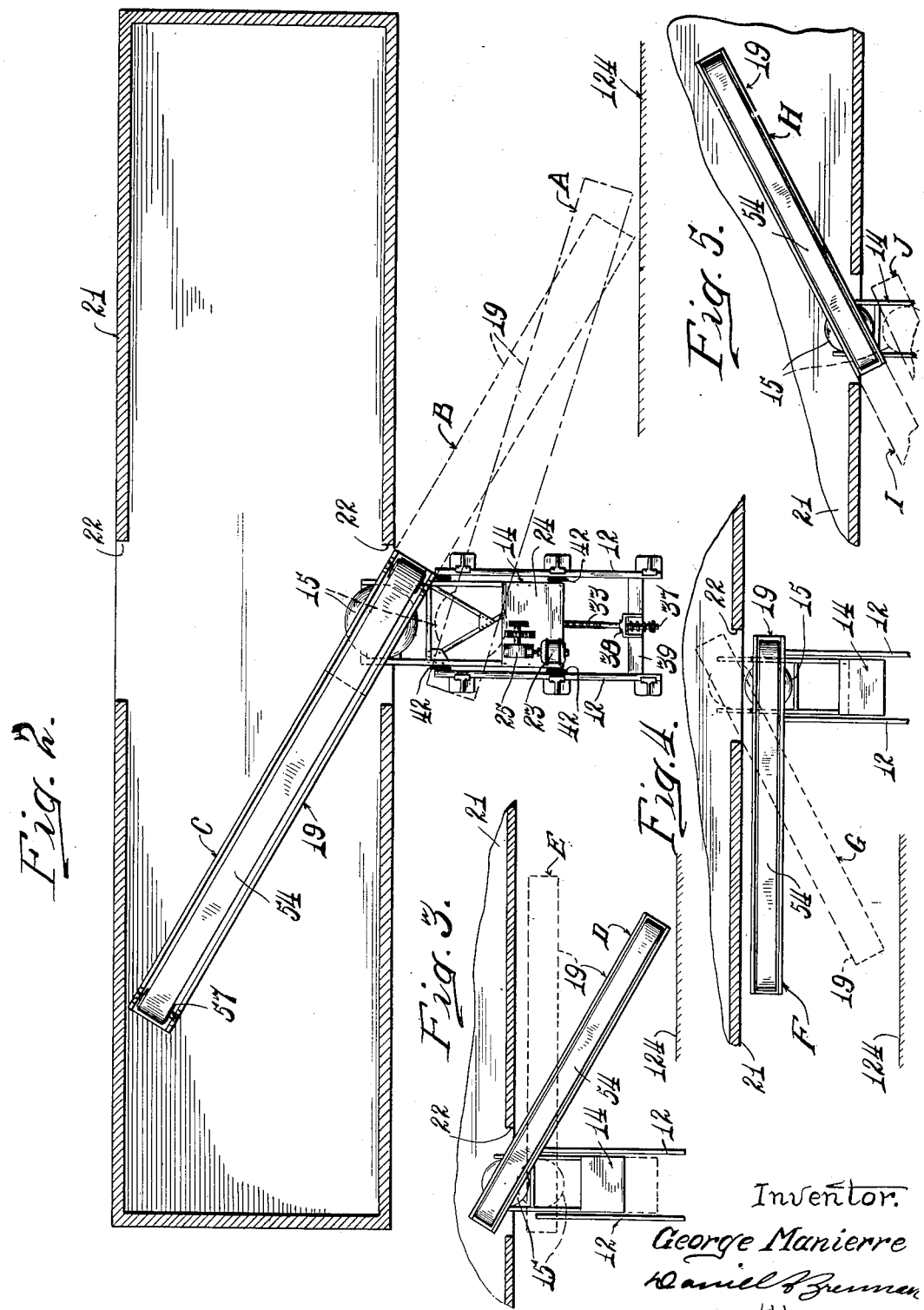
Inventor.
George Manierre
Daniel Brennen
Attorney.

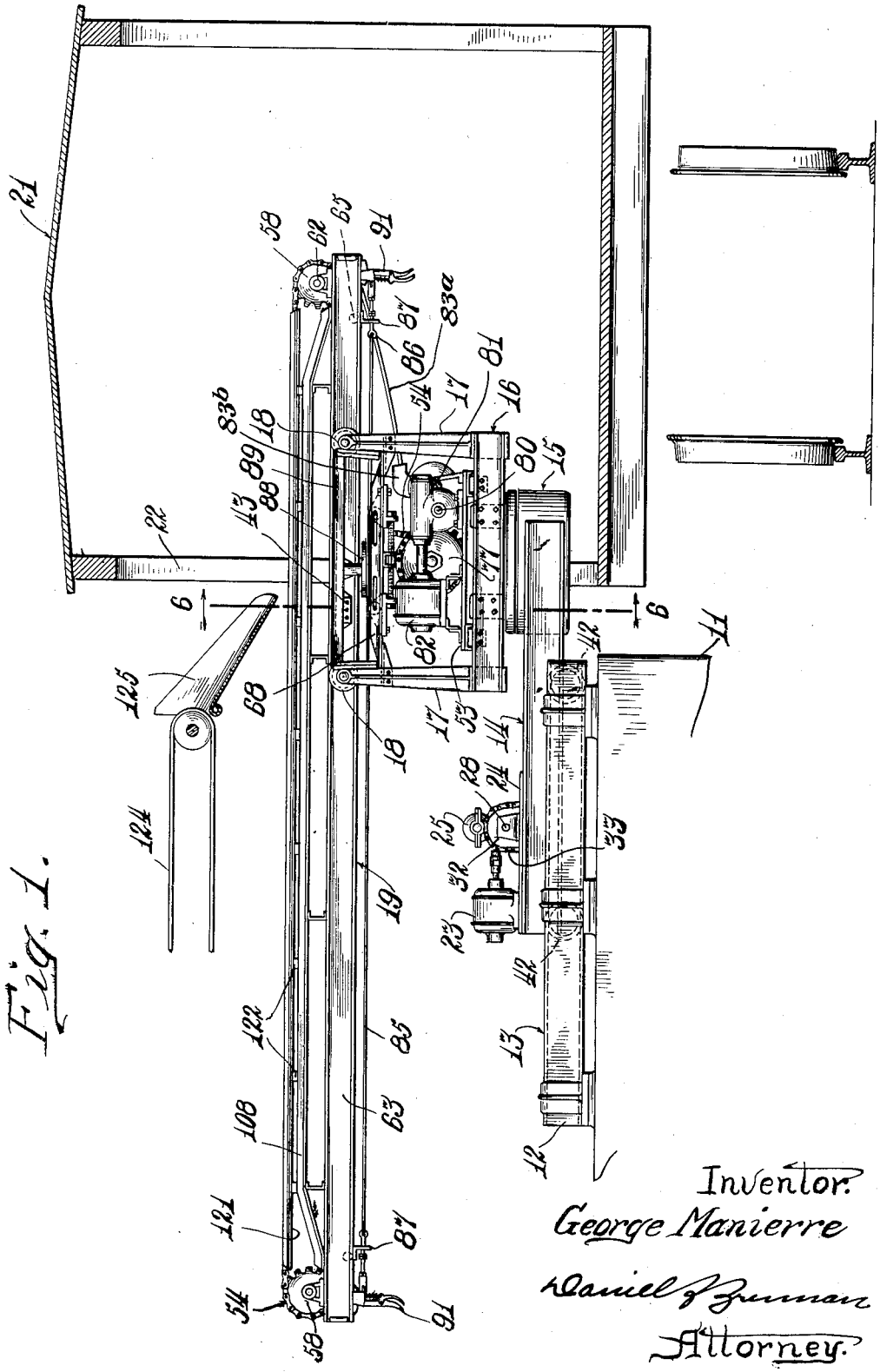

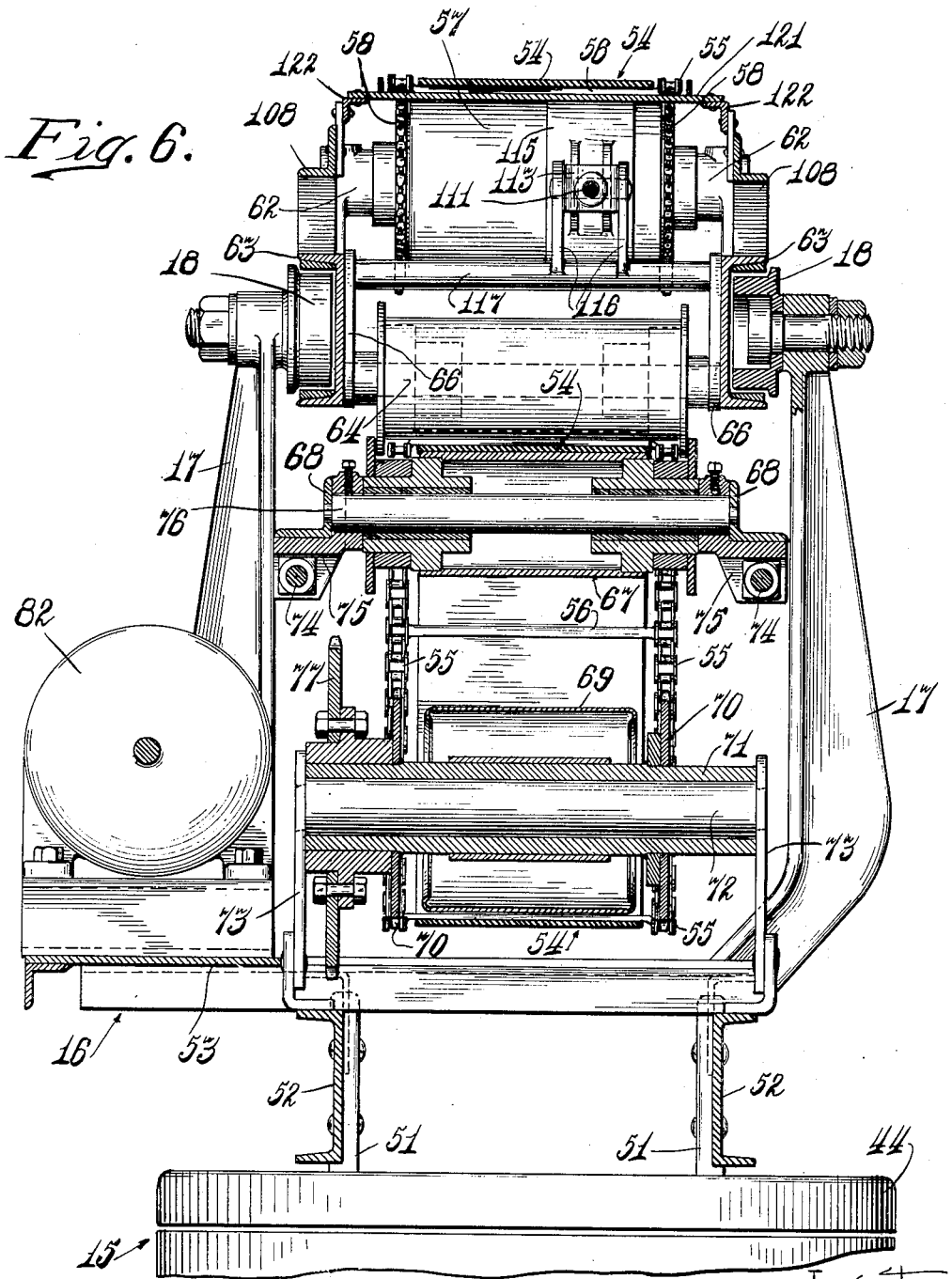

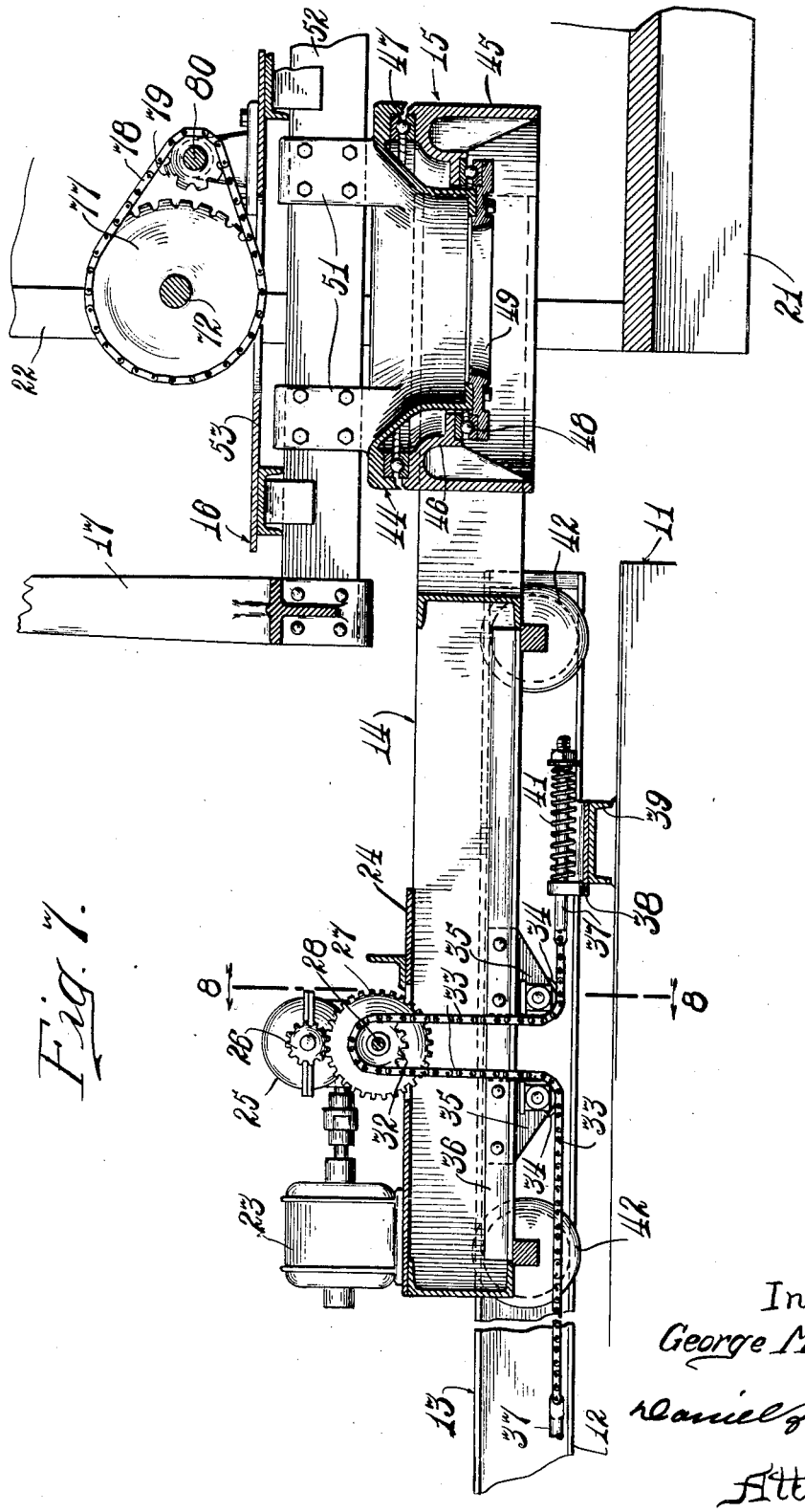

Aug. 22, 1933.   G. MANIERRE   1,923,836
LOADING MACHINE
Filed Feb. 27, 1932    10 Sheets-Sheet 5
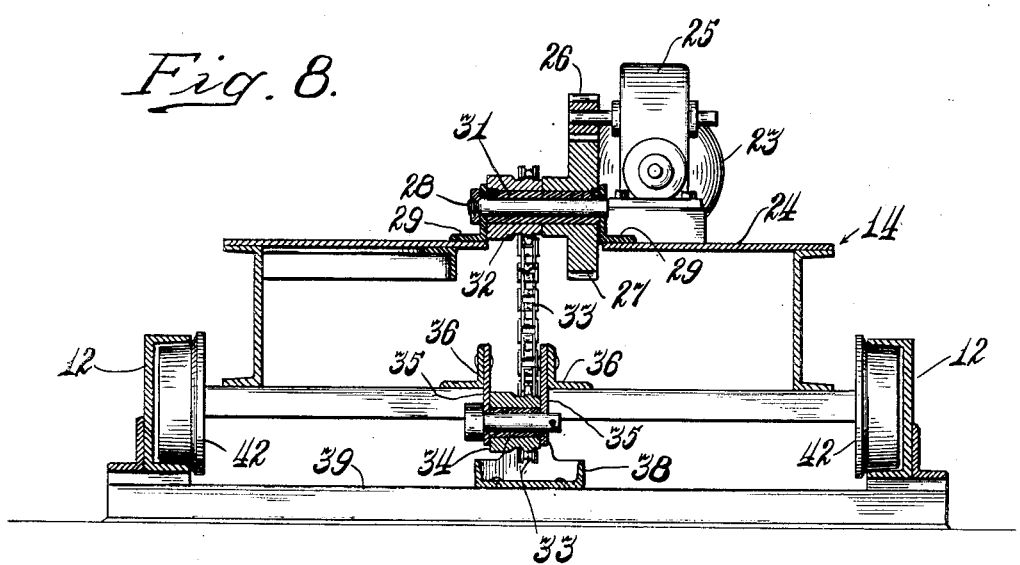
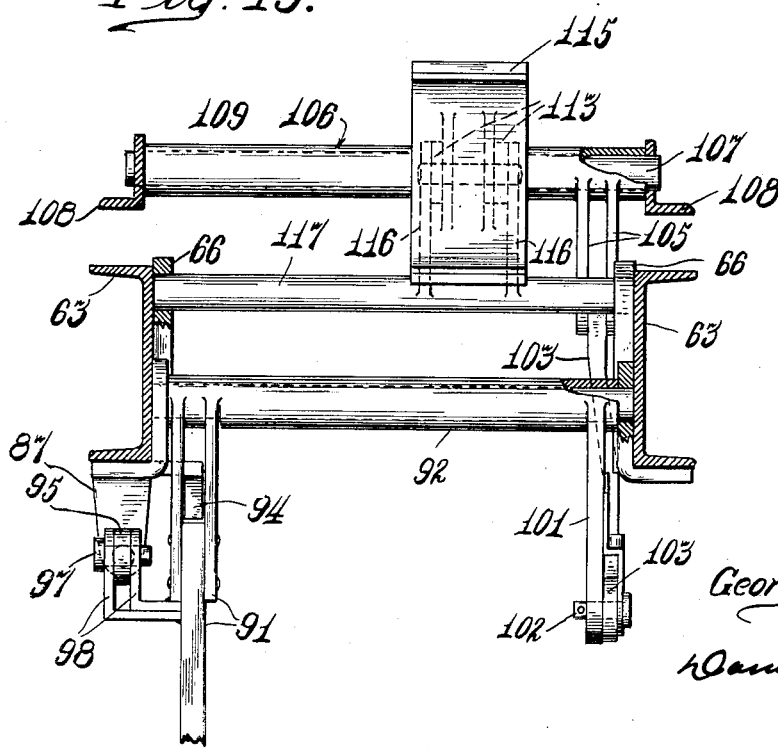
Inventor.
George Manierre
Daniel Brennan
Attorney.

Aug. 22, 1933.  G. MANIERRE  1,923,836
LOADING MACHINE
Filed Feb. 27, 1932   10 Sheets-Sheet 6
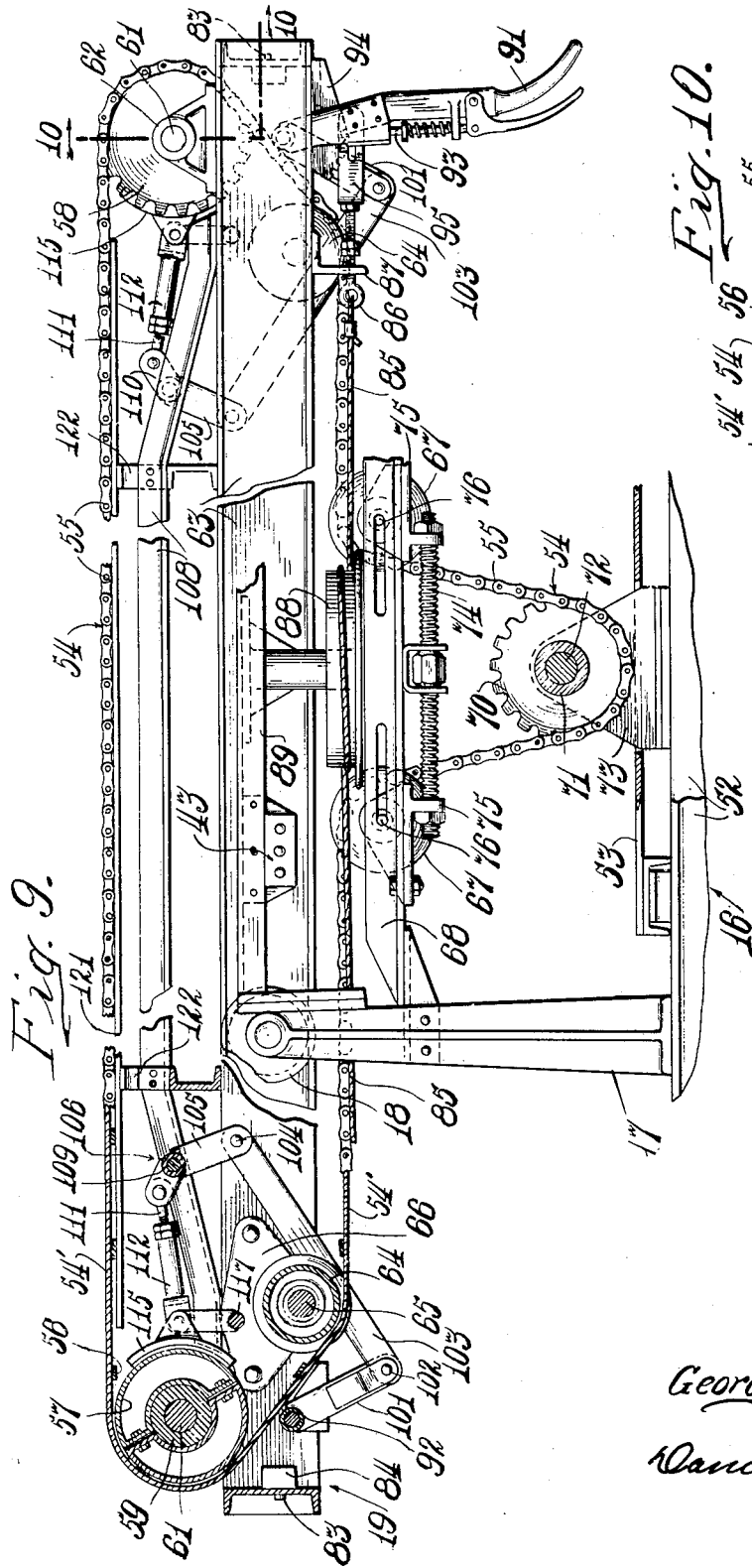
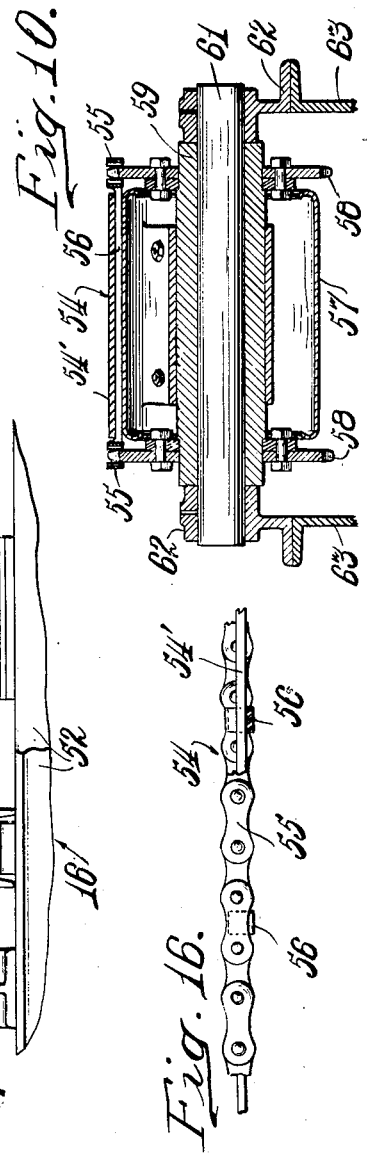
Inventor.
George Manierre
Daniel [signature]
Attorney.

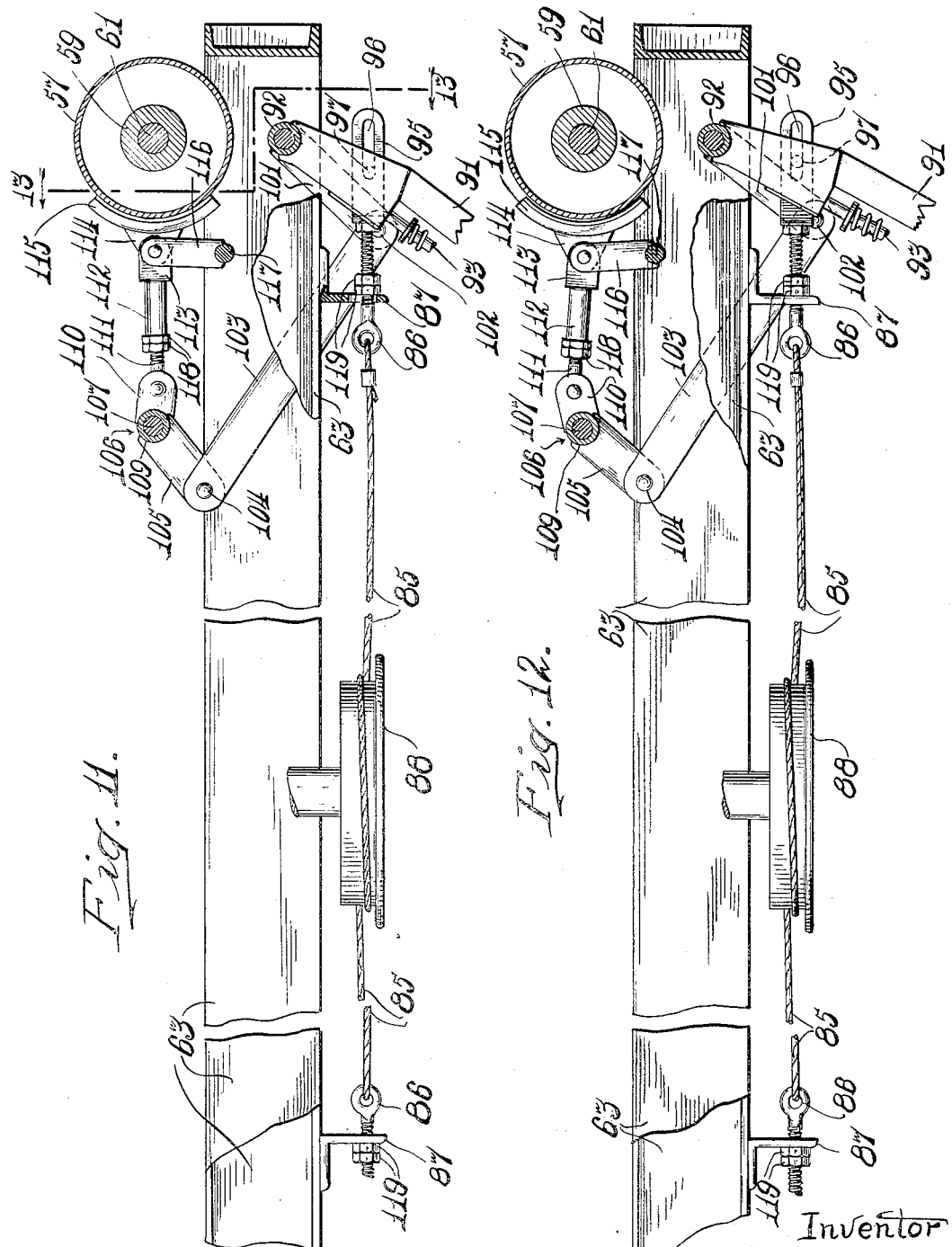

Aug. 22, 1933.  G. MANIERRE  1,923,836
LOADING MACHINE
Filed Feb. 27, 1932   10 Sheets-Sheet 8
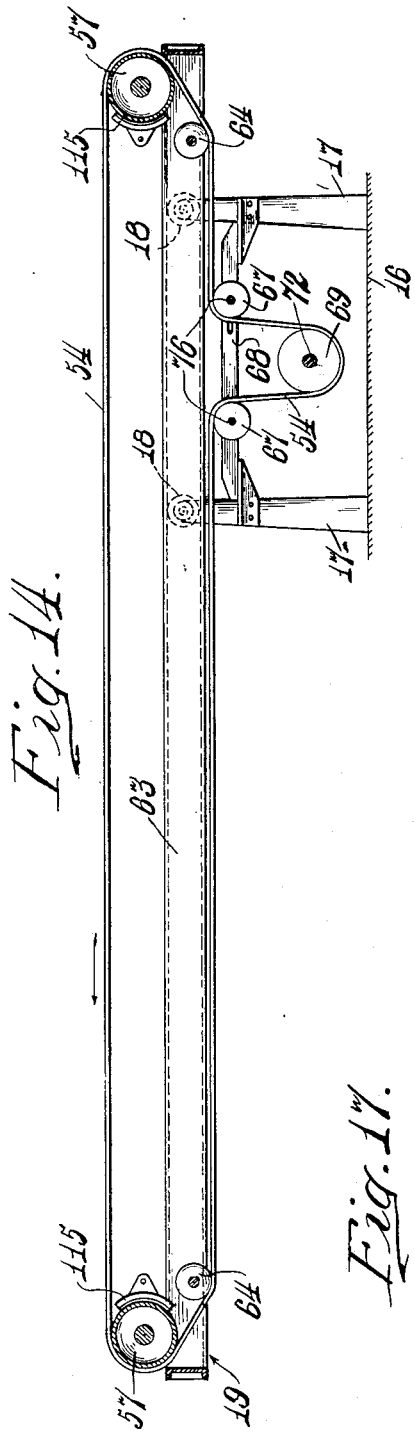
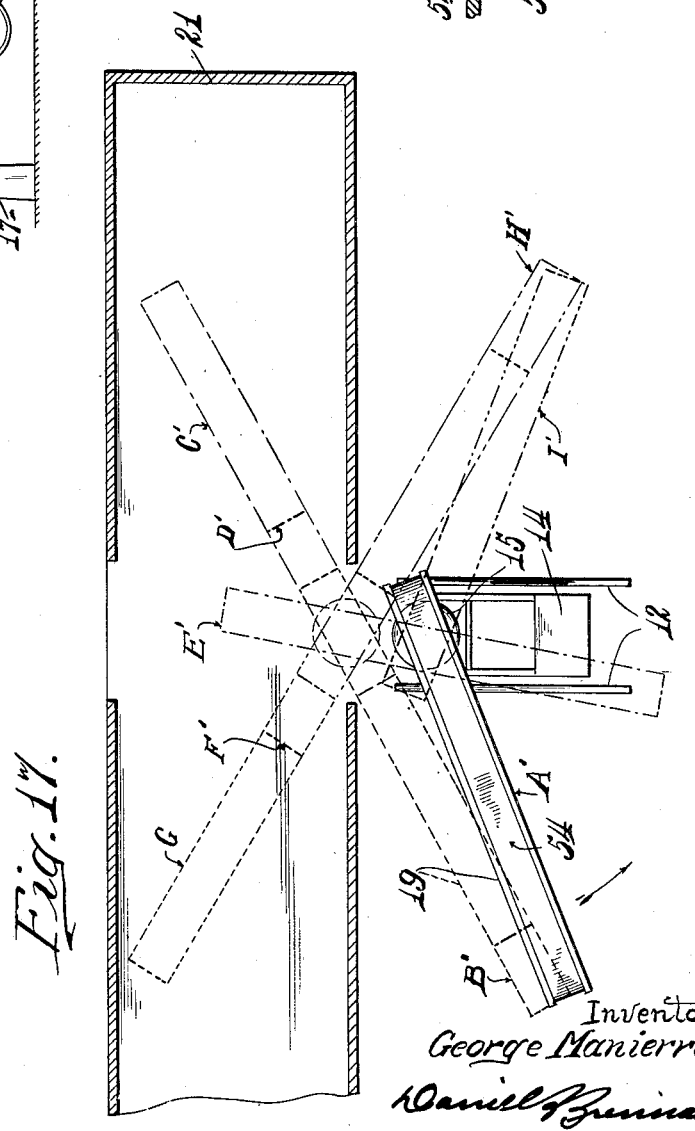
Inventor
George Manierre
Daniel J Brennan
Attorney.

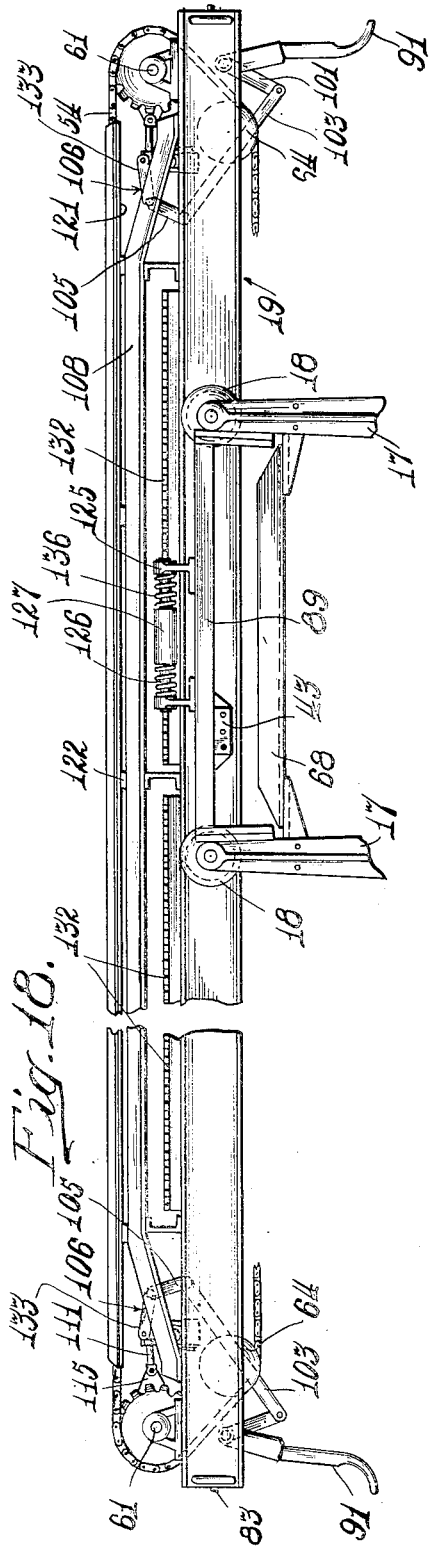
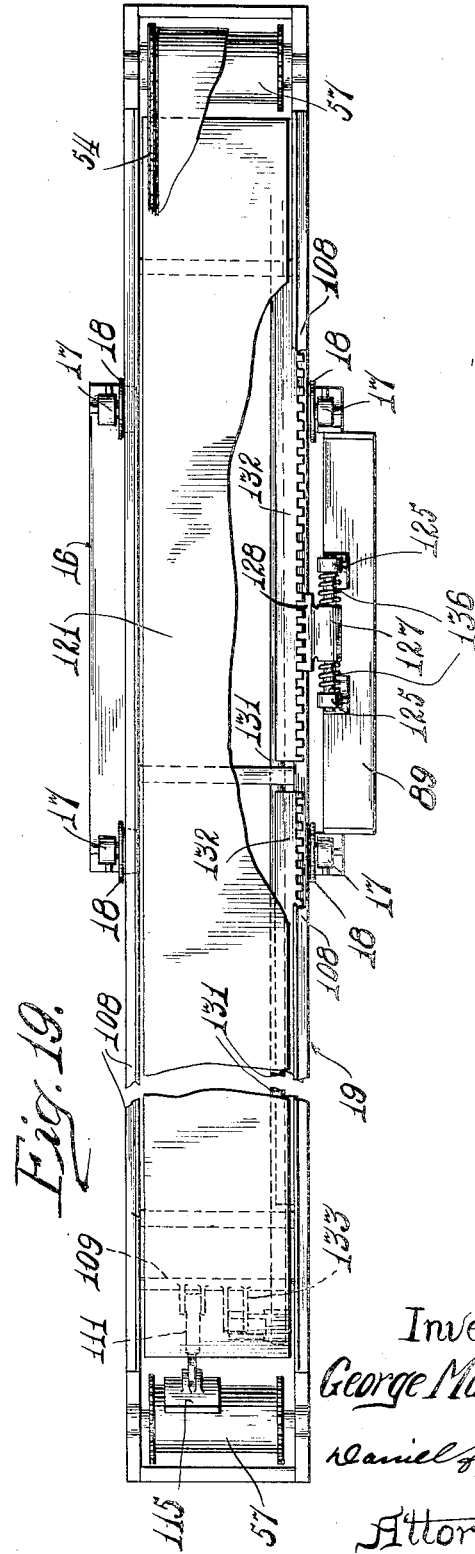

Aug. 22, 1933.  G. MANIERRE  1,923,836
LOADING MACHINE
Filed Feb. 27, 1932  10 Sheets-Sheet 10

Inventor
George Manierre
Daniel J Brennan
Attorney

Patented Aug. 22, 1933

1,923,836

UNITED STATES PATENT OFFICE 1,923,836

LOADING MACHINE

George Manierre, Milwaukee, Wis.

Application February 27, 1932
Serial No. 595,517

26 Claims. (Cl. 198—3)

The invention relates to improvements in loaders and more particularly to an improved car loader for conveying bags, or the like, through the usual car doorway into the interior of a railway box car for distribution at various points therein.

An object of the invention is to provide an improved car loader of the character referred to with a novel substantially universal mounting means to facilitate positioning of the machine to a great number of different positions to enable its use within a limited amount of space.

Another object is to provide a car loader of the character referred to with improved multiple control means whereby its operation may be controlled from a plurality of different locations, without necessitating the operator to leave the car.

Another object is to provide an improved car loader including a conveying frame and belt conveyor, with means operable by movement of the belt conveyor, for shuttling the conveyor frame into a plurality of different positions.

Another object is to provide a car loader with a conveyor frame mounted for universal movement in a horizontal plane, whereby said conveyor frame may be turned to a position substantially parallel with the car being loaded while shifting the conveyor frame from one end of the car to the other.

Another object is to provide a car loader of the character referred to including a rotatable carriage having a conveyor frame slidable therein, with independent operator-actuated means at each end of the conveyor frame and on the carriage to control operation of a belt conveyor carried in said frame.

Another object is to provide a car loader of this character with improved means for locking the slidable conveyor frame against movement while the belt conveyor is operating to deliver goods.

Another object is to provide improved mounting, operating, and control means for effecting movement of the improved car loader into operating position within the box car and for withdrawing same therefrom.

Another object is to provide improved manually-operable means for controlling the operation and movement of the various parts, and for locking such parts as are necessary in any adjusted position, relative to the remaining parts of the car loader and the car.

The foregoing and such other objects of the invention as will appear hereinafter as the description proceeds, will be more readily understood from a perusal of the following specification, reference being had to the accompanying drawings, in which:

Fig. 1 is a side elevational view of the improved car loader shown positioned within a box car, the latter being shown in section.

Fig. 2 is a plan view of the improved car loader, showing, in full lines, the conveyor frame extending into one end of a box car, and in dotted and broken lines, in a plurality of different withdrawn positions.

Figs. 3, 4, and 5 each show a plan view of the car loader, the conveyor frame being illustrated in various positions, both in full and dotted lines.

Fig. 6 is a vertical transverse sectional view, taken substantially on line 6—6 of Fig. 1.

Fig. 7 is a fragmentary longitudinal vertical sectional view through the slide frame and turn table mounting supporting the conveyor frame.

Fig. 8 is a transverse vertical sectional view, taken substantially on line 8—8 of Fig. 7.

Fig. 9 is a fragmentary side elevational view of the conveyor frame and associated parts, shown partly in section.

Fig. 10 is a transverse sectional view, taken on line 10—10 of Fig. 9.

Figs. 11 and 12 are fragmentary longitudinal sectional views of the conveyor frame, each showing the belt conveyor locking means in a differently adjusted position.

Fig. 13 is a vertical sectional view, taken on line 13—13 of Fig. 11.

Fig. 14 is a longitudinal sectional view through the conveyor frame and carriage therefor, illustrating diagramatically, the arrangement of the belt conveyor.

Fig. 15 is a detail sectional view of the belt conveyor and the drag plate therefor.

Fig. 16 is a fragmentary elevational view, partly in section, of the belt conveyor.

Fig. 17 is a diagrammatic plan view, of a different installation of the car loader, showing the conveyor structure in a plurality of different positions in full, broken, and dotted lines.

Fig. 18 is a fragmentary elevational view of a car loader, illustrating an alternate form of conveyor frame locking means.

Fig. 19 is a plan view of the conveyor frame and mounting shown in Fig. 18.

Figure 20:
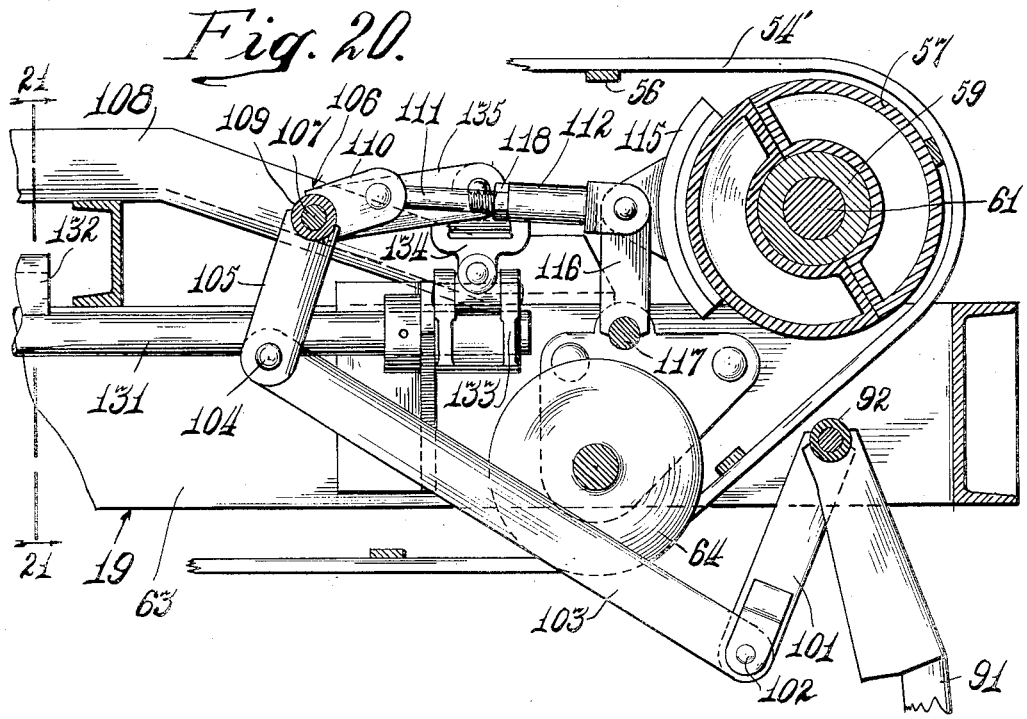

Fig. 20 is an enlarged fragmentary longitudinal sectional view through one end of the conveyor frame shown in Fig. 18.

Figure 21:
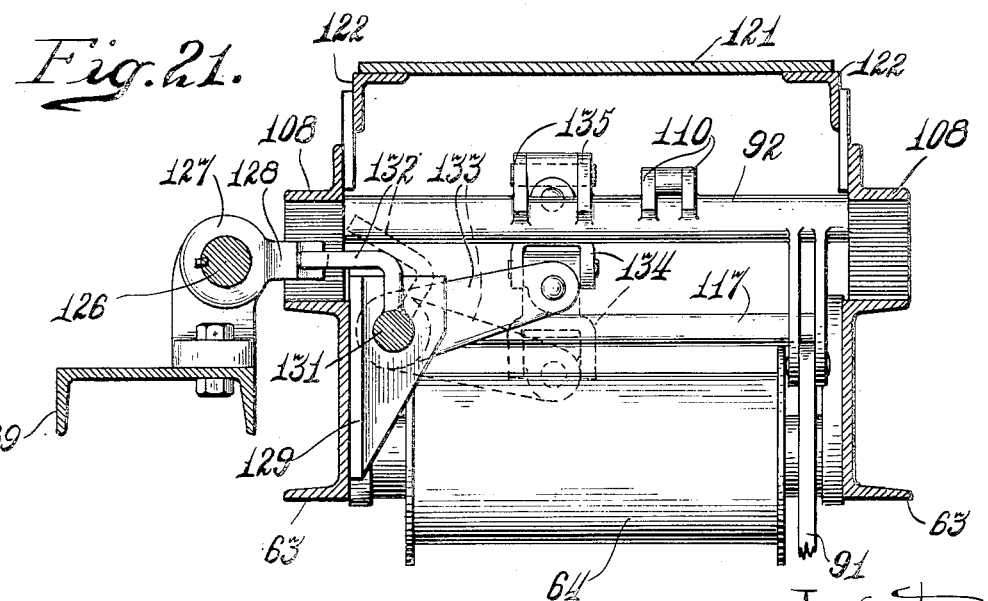

Fig. 21 is a transverse sectional view, taken substantially on line 21—21 of Fig. 20.

The improved car loader illustrated in the accompanying drawings is, as aforementioned, particularly designed for conveying into the interior of a railway box car or the like, bags or similarly crated or boxed articles for easy removal therefrom at various points of convenience within the car. As shown in the drawings, and particularly in Figs. 1 to 16, inclusive, illustrating one form of construction, a suitable foundation 11 (Fig. 1) firmly supports a pair of parallel spaced channels 12 forming a base frame 13 in which is slidably mounted a sliding frame 14. The sliding frame 14 has a turn table 15 rigidly supported on one end, upon which is mounted for free rotation through a horizontal plane, a suitable carriage 16 including spaced vertical supports 17 having rollers 18 on their upper ends, which co-operate with and support, for horizontal sliding or shuttling through the carriage, a conveyor frame 19.

The base frame 13 is positioned substantially at right angles to the box car 21 to be loaded. When said base frame is so positioned (Fig. 2), the sliding frame 14 which travels therein may be moved towards or away from the usual car door opening 22 for positioning the carriage and the conveyor frame, or any portion thereof, within said door opening in substantially the position illustrated in Figs. 1 and 2, or for withdrawing same into a position substantially as shown in full lines in Fig. 4.

Power means to facilitate movement of the sliding frame 14 preferably includes an electric motor 23 (Figs. 7 and 8) preferably mounted upon the top plate 24 of said frame, which operates, through reduction gearing 25, a pinion 26. The pinion 26 meshes with a gear 27, freely mounted upon a stud shaft 28 supported at its ends in angle brackets 29, mounted upon plate 24, and which is fixedly connected, through a sleeve 31, with a sprocket 32. A chain 33, trained over the sprocket 32, extends downwardly therefrom and then horizontally in opposite directions around rollers or sprockets 34 (Fig. 7) journaled in brackets 35 depending from angles 36, supported in and extending longitudinally of the sliding frame. Each end of the chain 33 is secured to a rod 37 mounted in a bracket 38 carried upon each cross beam 39 connecting the channels 12 of the base frame adjacent each end. Each rod 37 has a compression spring 41 thereon to allow for a limited amount of yield to prevent breaking of the chain 33 while starting the motor 23.

Operation of the motor 23 rotates the sprocket 32 for carrying the chain thereover, thus pulling the slide frame longitudinally of the base frame. Free movement of the slide frame 14 is assured by mounting it upon suitable rollers 42 which travel between the inwardly directed flanges of the channels 12, as best shown in Figs. 7 and 8.

While the car loader is not in use, the slide frame is positioned rearwardly (away from the railroad track). When the space, in which to move the conveyor frame about beside the track, is limited, said frame is then disposed parallelly or substantially parallelly with said track, as illustrated at A and E in Fig. 2 and 3. When illustrated at A and E in Figs. 2 and 3. When substantial alignment with the slide frame 14, the operator enters the car and by operation of one of a plurality of push buttons provided in a switch 43 (Figs. 1 and 9) on the carriage, closes an electric circuit to operate motor 23 and move the carriage 16 into the car, as shown at B in Fig. 2. While the carriage is moving into the car, the conveyor frame 19 strikes against one edge of the door opening and is turned about the turn table 15 to dispose one end thereof diagonally within the car.

The turn table 15 supporting the carriage 16 on one end of the slide frame 14 may be of any suitable construction. However, it is preferable that it be of the type shown (Fig. 7), having an upper turn table portion 44 resting on a suitable support 45 having an annular inwardly directed flange 46 carrying a ball bearing raceway 47 on which the weight of the turn table portion 44 rests. During the operation of the machine, any strain in an upwardly direction is absorbed by the flange 46 through ball bearings 48, which are inserted between the flange 46 and a ring 49 secured to the lower open end of the turn table portion 44. Spaced extensions 51, preferably formed integral with the turn table portion 44, extend upwardly vertically therefrom for supporting the carriage consisting of side members 52 carrying a platform 53. Suitable driving mechanism, to be described in detail hereinafter, for operating a belt conveyor 54 arranged for travel in the conveyor frame 19, is mounted upon the platform 53.

As shown in detail in Figs. 15 and 16, the belt conveyor 54 preferably is a built-up structure including endless chains 55, one on each side of an endless belt 54', connected at regular intervals by cross strips 56 extending laterally beneath the belt 54'. The belt conveyor thus provided is trained over suitable head pulleys 57 and sprockets 58 (Fig. 9) arranged one set adjacent each end of the conveyor frame 19. Upon reference to Fig. 10 it will be noted that each pulley 57 and its associated sprockets 58 is fixedly secured to a sleeve or hub 59 rotatably mounted upon a shaft 61 journaled at its ends in bearings 62 extending upwardly from channels 63 forming the longitudinal sides of the conveyor frame 19.

After passing around the head pulleys 57, the belt conveyor is trained around rollers 64 mounted for free rotation on stud shafts 65. These shafts are carried in brackets 66 mounted on the inside faces of channels 63, adjacent the bottom edges thereof. The belt conveyor continues over rollers 67, guided for horizontal adjustment along angles 68 extending longitudinally between the vertical supports 17 on the carriage 16, and over a suitable built-up pulley including a roller 69 and sprockets 70 (Figs. 6 and 9). The roller 69 and sprockets 70 are fixedly mounted upon a sleeve 71 which is rotatably mounted on a shaft 72 supported in plates 73 extending upwardly of the platform 53 on the carriage 16.

Adjustment of the rollers 67 is obtained readily by manipulation of the right and left threaded screw 74 which threadingly engages in slide brackets 75 carrying the shafts 76 upon which the rollers 67 are mounted. Adjustment of the rollers 67 takes up any slack developing in the belt conveyor.

A sprocket 77 (Figs. 6 and 7) is mounted upon the extended end of the sleeve 71 of the pulley 69 and is connected by a chain 78 to a sprocket 79 fixedly mounted on one end of the countershaft 80 extending through a gear reduction housing 81 mounted upon the platform 53. Power is supplied the reduction gearing in the housing 81 (Fig. 1) by an electric motor 82, also mounted on the platform 53. While the motor 82 is operating, the belt conveyor is carried around to convey the material deposited thereon to one end of the conveyor frame, from where it is removed and deposited within the car. A plurality of push buttons 83 (Fig. 9) are provided in switch boxes 84 arranged one at each end of the conveyor frame, operable independently of each other to start, stop and reverse the belt conveyor operating motor 82. These buttons are entirely independent, in operation, of the control buttons in switch box 43 on the carriage, and are electrically connected with the motor 82 through a multiple conductor cable 83a carried on a spring wound drum mounted in housing 83b, as shown in Fig. 1.

It is desirable and necessary that the conveyor frame 19 be held against sliding movement relative to the carriage 16 during the loading, and to this end, improved brake means is provided on the loader, controllable from either end of the conveyor frame. One form of such means is shown in Figs. 9, 11, and 12, wherein a cable 85 extends longitudinally of the conveyor frame, on one side thereof, having each of its ends connected to a suitable eye bolt 86 extending through a slotted opening in a bracket 87 depending below one of the channels 63, one adjacent each end. The cable 85 has one complete turn about a drum 88, fixedly anchored to a channel iron 89 extending horizontally between the vertical supports 17 on one side of the carriage 16. When the cable 85 is drawn taut (Fig. 9), in a manner to be described hereinafter, it grips the drum 88 firmly and prevents movement of the conveyor frame relative to the carriage.

The means provided adjacent each end of the conveyor frame to draw the cable 85 taut about the drum 88, or to effect its release, preferably includes a hand lever 91 fixedly mounted upon a pivotally mounted sleeve 92. Each lever 91 depends from sleeve 92 and has a spring-controlled plunger or dog 93 adapted to co-operate with a segment 94 carried on the conveyor frame. The hand lever 91 is operatively connected with the eye bolt 86 by a suitable bracket 95, slotted at 96, for receiving a pin 97 extending between spaced lugs 98 (Fig. 13) carried on the hand lever.

As hereinbefore described, the conveyor frame 19 is mounted for free sliding along rollers 18 on the vertical supports 17 of carriage 16, whereby said conveyor frame may be shuttled through from one side of the carriage to the other to facilitate positioning of the conveyor frame relative to the car being loaded. Shuttling of the conveyor frame through the carriage 16 is effected by manipulation of suitable manually operable means, provided on each end of the conveyor frame, operable independently for locking the belt conveyor 54 against movement relative to the conveyor frame. While the belt conveyor is thus locked, operation of motor 82 for moving the belt conveyor carries the entire conveyor frame horizontally through the carriage from one side to the other.

Since identically constructed locking means for the belt conveyor is provided at each end of the conveyor frame, the construction of the locking means at one end only will be described in detail. The reference numerals identifying the various parts of the locking means apply to similar parts of the mechanism arranged at the opposite end of the conveyor frame. Referring again to Figs. 9, 11, 12, and 13, a downwardly extending arm 101 is provided on the rotatable sleeve 92, which is connected, by pivotal pin 102, with a link 103 extending upwardly therefrom. The other end of link 103 is pivotally connected by a pin 104 with one arm 105 of a bell crank assembly 106, pivotally mounted on a laterally extending bearing pin 107 journaled at its ends in angles 108 extending longitudinally of and forming a truss frame for the conveyor frame.

The bell crank assembly 106 includes a sleeve or hub 109, carrying arm 105 adjacent one end and having angularly extending spaced arms 110 inwardly of said end. Pivotally mounted between said arms is a threaded stem 111 which threadingly engages in a sleeve 112 connected by a yoke 113 provided on its end, with spaced ears 114 carried on an arcuate brake shoe 115, arranged for engagement with the pulley 57. The brake shoe 115 is retained movably in position for engagement with pulley 57 by arms 116 connected at one end to the ears 114, and at their other end to a laterally extending rock shaft 117 journaled on its ends in bearing plates 66.

Adjustment of the tension applied to the roller by the brake 115 is accomplished by adjusting the stem 111 and sleeve 112, after which said parts are held in place by lock nuts 118. It will be noted that operation of the brake for locking the belt conveyor to the conveyor frame and operation of the cable 85 are accomplished by manipulation of the same hand lever 91.

Assuming the conveyor frame to be in the position, illustrated in Fig. 14, relative to the carriage 16, and the belt conveyor to be traveling in the direction of the arrow, the hand lever 91 on either end of the machine, will be in the position illustrated in Fig. 9. While the hand lever 91 is in this position, the cable 85 is drawn taut about the drum 88, and movement of the conveyor frame relative to the carriage is positively prevented.

While the loader is operating with the conveyor frame extending its full length into the car, it becomes necessary to move the conveyor frame at intervals without moving the carriage 16. This is accomplished, as aforementioned, by releasing the hand brake lever 91 from the position shown in Fig. 9 and moving it through the intermediate neutral position (Fig. 12), at which time the brake 115 is off and the cable 85 slackens, and into the position illustrated in Fig. 11, forcing the brake shoe 115 against the drum 57. Since the belt conveyor is traveling in the direction of the arrow (Fig. 14), the conveyor frame is shuttled through the carriage 16 because of the friction drag of the belt conveyor over the locked drum 57. When the brake shoe is again released, the hand lever 91 preferably is pulled up its entire distance to again draw the cable taut and lock the conveyor frame to the carriage.

The pin and slot connection 96—97 between the handle 91 and cable 85 allows the handle 91 to move over a part of its travel without effecting the tension of the cable 85. Such free movement is necessary to prevent concurrent locking of the belt conveyor to the conveyor frame and of the conveyor frame to the carriage. It will be noted that each eye bolt 86 is provided with adjustable nuts 119 which abut angles 87 while the cable is slack. Upon drawing the cable taut by manipulation of either of the hand levers 91, at one end of the cable, the nuts 119 on the eye bolt 86 on the opposite end of the cable remain against the associated angle 87 to hold that end of the cable whereby it may be drawn taut. The nuts 119 may be adjusted along the eye bolts 86, whereby the amount of slack in the cable may be varied to provide the required cable length to insure its gripping the drum 88 when the operating handle 91 is manipulated for this purpose.

To prevent sagging and to guide the belt conveyor 54 between the rollers 57 on the conveyor frame, a suitable drag plate 121 (Figs. 6 and 15) is supported at regular intervals by brackets 122 above the truss frame 108. The plate 121 has longitudinally extending strips of material 123 (Fig. 15) over which the chains 55 are guided. The operation and ease with which the improved car loader hereinbefore described may be manipulated is clearly indicated in Figs. 1 to 5, inclusive, and is substantially as follows:

Assuming, for example, that the machine to be installed within a limited space between a track and a building, the improved car loading machine, in its initial position, stands with the carriage 16 withdrawn from the car and the conveyor frame preferably extending at right angles to one side thereof, parallel or substantially parallel with the car body. Where conditions warrant, the conveyor frame may be disposed at an angle thereto, such as the position indicated at (A) Fig. 2, with its extended end disposed near the wall 124 of the building. The operator enters the car to be loaded and by manipulation of one of the plurality of push buttons in the switch box 43 (Fig. 1) on the carriage, starts the motor 23 to slide the frame 14 and the carriage 16 into the car. The slide frame operating motor is stopped, by operation of a switch button in switch box 43, when the carriage reaches the position illustrated in full and dotted lines at (B) Fig. 2, with the turntable 15 in substantial alignment with the inside face of the side wall of the car 21. During the inward movement of the carriage 16, the conveyor frame 19 strikes one edge of the door openings 22 and is turned about the turntable 15.

The operator then sets one of the brake shoes 115 by manipulating the lever 91 on the end of the conveyor frame now extending into the car, and by operating one of the push buttons 83 (Fig. 9) on the same end of the conveyor frame, starts the belt conveyor motor 82. The belt conveyor, being securely locked to the conveyor frame 19, carries the conveyor frame through the carriage 16 into one end of the car, as illustrated at (C) in Fig. 2. When the conveyor frame reaches this position, the operator, who has backed into the end of the car with the conveyor frame, releases the set brake, by manipulation of the hand lever previously set, and manipulates the proper push buttons at 83 on the end of the conveyor frame to stop the belt conveyor and start it again in the reverse direction.

The belt conveyor is now being operated in the proper direction to deliver bags or other material, delivered thereto by a suitable belt conveyor 124 and chute 125 (Fig. 1), into the far end of the car from where it is removed by the operator and stacked. As the end of the car becomes loaded, the operator again manipulates the hand lever 91, previously operated, to lock the belt conveyor to the conveyor frame for shutting the conveyor frame outwardly of the car. When the conveyor frame has moved back the desired distance, the hand lever is released.

During the operation of the belt conveyor for delivering goods, the hand lever is pulled back all the way to draw the cable taut and lock the conveyor frame against movement. Alternate locking and releasing of the conveyor frame relative to the carriage is semi-automatically accomplished, because the lever used for locking and releasing the belt conveyor is used for setting and releasing the conveyor frame locking means.

Alternately backing the conveyor frame out of the car, and delivering goods into the car is continued until the conveyor frame reaches a position almost entirely out of the car, as illustrated at (D) Fig. 3. The operator, remaining in the car, now starts the motor 23, by manipulation of one of the buttons in switch box 43 on the carriage, to move the carriage out of the car. During this outward movement, the operator grasps one of the uprights 17 on the carriage 16 and swings the conveyor frame 19 about the turntable 15 into a position substantially parallel with the car wall, as illustrated in dotted lines (E) in Fig. 3.

The carriage motor 23 is then stopped, and by manipulation of other switches in switch box 43, the operator starts the belt conveyor 54, and the conveyor frame 19, having previously been locked to the belt, shuttles through the carriage to the opposite side thereof, as shown at (F) in Fig. 4. The belt conveyor 54 is again stopped and the operator starts the carriage motor 23 to move the carriage into the car. While the carriage is traveling into the car, the conveyor frame 19 strikes the edge of the door opening, as before, and is again swung at an angle into the position illustrated in dotted lines at (G) in Fig. 4.

With the loader in this position, the carriage motor 23 is stopped and the operator again starts the belt conveyor 54 in the reverse direction, by manipulation of one of the switches in switch box 43 on the carriage. Because the belt 54 is still held by the brake, the conveyor frame shuttles through the carriage into the empty end of the car, and as the outside end of the conveyor frame comes up to the carriage, the operator reaches over and releases the brake. It will be noted that this brake had been set when the conveyor frame was moved out of the car, in the first instance, prior to being shuttled over on the other side.

The conveyor structure now assumes the position illustrated at (H) in Fig. 5 and the operator goes into the end of the car, starts the belt conveyor motor from the end of the conveyor frame and proceeds with the loading. As this end of the car becomes filled, the operator, by alternately setting and releasing the brake for holding the belt to the conveyor frame, intermittently shuttles the conveyor frame outwardly of the car. It will be noted that all of these operations are effected without the operator leaving the car at any time.

Where sufficient clearance is provided to permit swinging of the conveyor frame about the turntable without shuttling through, substantially parallel with the car, as in the installation previously described, control means for the carriage is provided as before on the carriage, and means controlling the operation of the belt conveyor on one end of the conveyor frame only. The various positions assumed by such a machine are illustrated in Fig. 17, the relation of the various positions, relative to each other, being indicated by the alphabetical lettering.

The car loader illustrated in Figs. 19 to 21, inclusive, is substantially like that loader previously described and like parts are identified by the same numerals. However, in this machine another mechanism is provided for locking the conveyor frame 19 to the carriage 16. To this end, the horizontal channel iron 89 has spaced bearings 125 mounted thereon and extending upwardly therefrom, having a shaft 126 fixedly mounted therein. Slidably mounted on said shaft between the bearings 125 is a sleeve 127, keyed, or otherwise held to prevent its rotation about said shaft, having an inwardly extending toothed portion 128.

Extending longitudinally of the conveyor frame and freely journaled in suitable brackets 129, is a rock shaft 131 having over its entire length a plurality of L-shaped racks 132 extending upwardly and outwardly therefrom, for engaging with the teeth on portion 128 of sleeve 127. Such engagement takes place when the rock shaft is positioned substantially as illustrated in full lines in Figs. 18, 19, and 21. The rock shaft 131 terminates short of each end of the conveyor frame and has, on each end, an arm 133 each of which is connected by a universal connector link 134 with spaced arms 135 extending from and formed integral with the rock sleeve 109 of bell crank assembly 106.

The connection is such that upon manipulation of either one of the hand levers 91 on either end of the conveyor frame to unlock the parts, operates, through the respective universal connector 134 and arm 133, to rotate the rock shaft 131 for swinging the L-shaped racks 132 substantially into the position illustrated in dotted lines in Fig. 21, out of engagement with the toothed portion 128.

When the conveyor frame is to be locked relative to the carriage, the hand lever 91 is again manipulated to swing the rack bars 132 back into position for engagement with the teeth on portion 128. Any shock or strain to which the toothed portion may be subjected by engagement of the rack bar therewith is absorbed by suitable springs 136, arranged one on each side of the sleeve 127, between bearings 125. Since the rack bars 132 extend substantially the entire length of the conveyor frame, means is provided for locking the conveyor frame, irrespective of the relative position of said frame with the carriage.

It can readily be understood that this method of locking the conveyor frame to the carriage is very positive, and periodical adjustment, such as becomes necessary with the form of locking means previously described, because of the wearing or stretching of the locking cable, is avoided.

The extreme flexibility of movement of the improved loader and the provision of a plurality of remote controls provide a loader particularly adapted for car loading where the space allowed for such equipment is very limited. Much time is saved during loading by the remote control means, since the operator has the complete control of the loader within reach at all times.

Although exemplary forms of the improved device have been shown in the accompanying drawings and described in detail in the specification, it is to be understood that the improved car loader may embody numerous variations in detail structure and arrangement of parts without departing from the spirit of the invention or the scope of the appended claims.

I claim:

1. A car loader including a carriage, a conveyor frame slidable in said carriage, an endless belt conveyor in said conveyor frame, means on said carriage to operate said belt conveyor, a cable on said conveyor frame adapted to be drawn taut and co-operate with means on said carriage to lock said conveyor frame against movement therein while the belt conveyor is operating, the cable operating means being operable upon slacking said cable to lock said belt conveyor to said conveyor frame whereby said conveyor frame is moved in said carriage.

2. A car loader including a slidable carriage, a conveyor frame slidable in said carriage, a cable connected to each end of said conveyor frame adapted to be drawn taut to frictionally engage means on the carriage to lock said frame against movement relative to said carriage, a belt conveyor in said conveyor frame, operating means for said belt conveyor on said carriage, and means operable upon release of said cable to lock the belt to said conveyor frame for moving the latter relative to the carriage.

3. In a conveyor machine including a carriage having a conveyor frame slidable therein, a belt conveyor in said frame, belt operating means in said carriage, cable means movable by manipulation of an operator controlled element to lock said conveyor frame relative to said carriage while the belt conveyor is in operation, and means operable by release of said cable means to lock the belt conveyor against movement relative to said conveyor frame whereby said frame is moved relative to the carriage.

4. In a device of the character described, the combination of a slidable frame, a turntable on said frame, a carriage on said turntable, a conveyor frame slidable in said carriage, a belt conveyor in said conveyor frame, a motor for operating said belt conveyor on said carriage, and selective means including a cable on said conveyor adaped to co-operate with means on the frame to lock said frame to said carriage, said means being operable independently of the cable to lock said belt conveyor to said conveyor frame for sliding the latter in said carriage.

5. A car loader including a carriage having a conveyor frame slidable therein, a belt conveyor in said conveyor frame, operating means for said belt conveyor on said carriage, a drum on said carriage, a cable turned about said drum having its respective ends secured to manually operable levers one at each end of said conveyor frame, said cable being drawn taut upon manipulation of either of said levers to secure said conveyor frame against movement relative to said carriage, and means operable upon release of said cable to lock the belt conveyor to said conveyor frame whereby said frame may be moved relative to said carriage upon operation of said belt conveyor.

6. In a car loader, a carriage, a conveyor frame slidable on said carriage, a hand lever at each end of said conveyor frame, a stationary drum on the carriage, a cable wound about said drum having an end secured to each of said hand levers, whereby said cable is drawn taut about said drum to lock the conveyor frame against movement relative to said carriage.

7. In a car loader, a carriage, a conveyor frame slidable in said carriage, a belt conveyor trained over rollers in said conveyor frame, operating means for said belt conveyor on said carriage, manually operated toggle means to lock said rollers and hold the belt relative to said frame to slide the latter in said carriage upon operation of said belt, and cable means to lock said conveyor frame against movement relative to said carriage upon release of the belt locking means whereby said belt runs freely in said conveyor frame.

8. In a car loader, a carriage, a conveyor frame slidable in said carriage, a belt conveyor in said conveyor frame, operating means for said belt conveyor on said carriage, means including levers operable to lock said belt to said frame to move the latter relative to the carriage upon operation of said belt, a stationary drum on said carriage, and a cable having an end secured to each of said levers wound about said drum adapted to be drawn taut upon release of the belt locking means to lock the conveyor frame against movement relative to the carriage.

9. In a loading machine including a carriage and a conveyor frame slidable thereon, a belt conveyor trained over rollers in said conveyor frame, power means on said carriage operable to operate the belt conveyor, a hand lever at each end of said conveyor frame operable independently of each other to actuate means to lock the rollers to hold the belt to the conveyor frame whereby said frame is moved relative to the carriage upon operation of the belt, and means operable by said levers upon release of said lock means to lock the conveyor frame to the carriage.

10. In a loading machine, including a carriage having a conveyor frame slidable therein, a belt conveyor in said conveyor frame, power operating means on said carriage to operate said conveyor, a drum on said carriage, a cable wrapped about said drum, a hand lever at each end of said conveyor frame each having one end of said cable secured thereto whereby upon manipulation of either hand lever the cable is drawn taut to lock the conveyor frame to the carriage, and means operable by either of said hand levers upon slacking of said cable to lock the belt conveyor to the conveyor frame to move said frame in the carriage upon operation of the belt.

11. In a loading machine, including a conveyor frame slidable on a carriage, a belt conveyor in said conveyor frame, power operating means on said carriage to operate said belt conveyor, a hand lever at each end of said conveyor frame, a cable having its ends connected one to each hand lever, means operable upon movement of either handle in one direction to lock the belt conveyor to the conveyor frame whereby said conveyor frame is moved relative to said carriage by said belt, said cable becoming slack, and means on the carriage adapted to be frictionally engaged by said cable upon movement of either of said levers in the reverse direction to release said lock means and lock the conveyor frame to said carriage in any position relative to the carriage.

12. In a loading machine including a conveyor frame slidable on a carriage, a power operated endless belt trained over rollers one at each end of said conveyor frame, operating means for said belt on said carriage, a brake shoe adjacent each roller, a hand lever on each end of said frame each operatively connected with one of said brake shoes operable to move the respective brake shoe into engagement with the adjacent roller to lock the belt to said conveyor frame whereby said frame is moved therewith in said carriage, and means operatively connected with said carriage operable by said levers to lock the conveyor frame to said carriage upon release of said brake shoes.

13. In a car loader, a carriage, a conveyor frame slidable on said carriage, a hand lever at each end of said conveyor frame, a cable on said conveyor frame operable by manipulation of said hand levers to co-operate with means on the carriage to lock said conveyor frame against movement relative to the carriage, a belt conveyor freely mounted in said conveyor frame operable by power operated means on the carriage, and means operable upon release of said cable to lock the belt conveyor to the conveyor frame whereby said conveyor frame is moved relative to said carriage upon operation of said power operated means.

14. A car loader including a carriage having guide rollers thereon, a conveyor frame slidable over said rollers, a rack carried on said frame, a toothed stop on said carriage, and means operable from each end of said conveyor frame to move said rack into position for engagement with said stop to lock the conveyor frame against movement relative to the carriage.

15. A machine of the character described including a carriage, a conveyor frame slidable in said carriage, an endless belt conveyor in said conveyor frame, means on said carriage to operate said belt conveyor, a rack on said conveyor frame movable into co-operative engagement with means on said carriage to lock said conveyor frame against movement therein while the belt conveyor is operating, the rack operating means being operable upon disengagement of the rack with the means on the carriage to lock said belt conveyor to said conveyor frame whereby said conveyor frame is moved in said carriage.

16. A machine of the character described, including a slidable carriage, a conveyor frame slidable in said carriage, a rack mounted on said conveyor frame adapted to be moved into engagement with means on the carriage to lock said frame against movement relative to carriage, a belt conveyor in said conveyor frame, operating means for said belt conveyor on said carriage, and means operable upon disengagement of said rack to lock the belt to said conveyor frame for moving the latter relative to the carriage.

17. In a machine of the character described including a carriage having a conveyor frame slidable therein, a belt conveyor in said frame, belt operating means in said carriage, a rack movable by an operator controlled element to lock said conveyor frame relative to said carriage while the belt conveyor is in operation, and means operable upon returning said rack to its unlocked position to lock the belt conveyor against movement relative to said conveyor frame whereby said frame is moved relative to the carriage.

18. A machine of the character described including a carriage having a conveyor frame slidable therein, a belt conveyor in said conveyor frame, operating means for said belt conveyor on said carriage, a stop on said carriage, a movable longitudinally extending rack on said conveyor frame operatively connected to manually operable levers one at each end of said conveyor frame, said rack being moved into engagement with said stop upon manipulation of either of said levers to secure said conveyor frame against movement relative to said carriage, and means operable upon disengagement of said rack to lock the belt conveyor to said conveyor frame whereby said frame may be moved relative to said carriage upon operation of said belt conveyor.

19. In a machine of the character described, a carriage, a conveyor frame slidable in said carriage, a belt conveyor trained over rollers in said conveyor frame, operating means for said belt conveyor on said carriage, manually operated toggle means to lock said rollers and hold the belt relative to said frame to slide the latter in said carriage upon operation of said belt, and complemental locking elements on said conveyor frame and said carriage adapted to lock said conveyor frame against movement relative to said carriage upon release of the belt locking means whereby said belt runs freely in said conveyor frame.

20. In a machine of the character described, a carriage, a conveyor frame slidable in said carriage, a belt conveyor in said conveyor frame, operating means for said belt conveyor on said carriage, means including levers operable to lock said belt to said frame to move the latter relative to the carriage upon operation of said belt, a yieldable stop on said carriage, and a rack operatively connected to each of said levers movable into engagement with said stop upon release of the belt locking means to lock the conveyor frame against movement relative to the carriage.

21. In a machine of the character described, including a conveyor frame slidable on a carriage, a belt conveyor in said conveyor frame, power operating means on said carriage to operate said belt conveyor, a hand lever at each end of said conveyor frame, a rack shaft operatively connected to each hand lever, means operable upon movement of either hand lever in one direction to lock the belt conveyor to the conveyor frame whereby said conveyor frame is moved relative to said carriage by said belt, and means on the carriage adapted to be engaged by means on said rack shaft upon movement of either of said levers in the reverse direction to release said belt locking means and lock the conveyor frame to said carriage in any position relative to the carriage.

22. In a machine of the character described, a carriage, a conveyor frame slidable on said carriage, a hand lever at each end of said conveyor frame, a rack carried on a rack shaft mounted on said conveyor frame movable by manipulation of said hand levers into engagement with means on the carriage to lock said conveyor frame against movement relative to the carriage, a belt conveyor freely mounted in said conveyor frame operable by power operated means on the carriage, and means operable upon disengagement of said rack to lock the belt conveyor to the conveyor frame whereby said conveyor frame is moved relative to said carriage upon operation of said power operated means.

23. In a device of the character described, the combination of, a slidable frame, a turntable on said frame, a carriage on said turntable, a conveyor frame slidable in said carriage, a belt conveyor in said conveyor frame, a motor for operating said belt conveyor on said carriage, and selective means including a rack on said conveyor frame adapted to cooperate with means on the carriage to lock said frame to said carriage, said selective means being operable upon disengagement of said rack from the means on the carriage to lock said belt conveyor to said conveyor frame for sliding the latter in said carriage.

24. In a machine of the character described, including a carriage having a conveyor frame slidable therein, a belt conveyor in said conveyor frame, operating means for said belt on said carriage, means operable from either end of said conveyor frame to lock the belt to said conveyor frame for sliding the conveyor frame along said carriage upon operation of said belt conveyor, and means operable upon release of the belt lock to lock the conveyor frame against movement relative to the carriage.

25. In a machine of the character described, the combination of a sliding frame, power means to slide said frame, a carriage rotatably mounted on said frame, means on the carriage to control the sliding of said frame, a conveyor frame slidably mounted on said carriage, a belt conveyor in said conveyor frame, operating means for said belt conveyor carried by said carriage, means at each end of said conveyor frame controlling the operation of said belt conveyor operating means, means including manually operable elements one on each end of said conveyor frame operable to lock the belt conveyor to said frame whereby said frame is moved along said carriage upon operation of said belt conveyor operating means, and means actuated upon release of said belt conveyor locking means to lock the conveyor frame to the carriage.

26. In a machine of the character described, the combination of a sliding frame, power means to slide said frame, a carriage rotatably mounted on said frame, means on said carriage to control operation of said power means, conveyor frame mounted for longitudinal sliding on said carriage, a belt conveyor in said conveyor frame, operating means for said belt conveyor mounted on said carriage, means at each end of said conveyor frame operable to control operation of the belt conveyor operating means, means including manually operable hand levers one on each end of the conveyor frame independently operable to lock the belt conveyor to the conveyor frame whereby said frame is moved along the carriage upon operation of the belt conveyor power means, and means actuated upon release of said belt conveyor locking means to lock the conveyor frame to the carriage and prevent movement thereof relative to said carriage while the belt conveyor is operating.

GEORGE MANIERRE.